United States Patent
Chen et al.

(10) Patent No.: US 12,177,873 B2
(45) Date of Patent: Dec. 24, 2024

(54) DETERMINING METHOD, TERMINAL, AND NETWORK DEVICE

(71) Applicant: VIVO MOBILE COMMUNICATION CO., LTD., Guangdong (CN)

(72) Inventors: Xiaohang Chen, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 645 days.

(21) Appl. No.: 17/167,038

(22) Filed: Feb. 3, 2021

(65) Prior Publication Data

US 2021/0168834 A1 Jun. 3, 2021

Related U.S. Application Data

(63) Continuation of application No. PCT/CN2019/097427, filed on Jul. 24, 2019.

(30) Foreign Application Priority Data

Aug. 7, 2018 (CN) .......................... 201810893011.5
Aug. 9, 2018 (CN) .......................... 201810904371.0

(51) Int. Cl.
*H04W 72/50* (2023.01)
*H04W 72/0446* (2023.01)
*H04W 72/21* (2023.01)

(52) U.S. Cl.
CPC ..... *H04W 72/535* (2023.01); *H04W 72/0446* (2013.01); *H04W 72/21* (2023.01)

(58) Field of Classification Search
CPC .......... H04W 72/535; H04W 72/0446; H04W 72/21; H04W 72/23; H04W 16/14;
(Continued)

(56) References Cited

U.S. PATENT DOCUMENTS

2015/0023299 A1* 1/2015 Sakoda ................ H04W 48/02
370/329
2017/0251464 A1 8/2017 Mukherjee
(Continued)

FOREIGN PATENT DOCUMENTS

CN 105049136 A 11/2015
CN 105991210 A 10/2016
(Continued)

OTHER PUBLICATIONS

European Search Report dated Sep. 28, 2021 as received in application No. 19846781.3.
(Continued)

*Primary Examiner* — Peter P Chau
(74) *Attorney, Agent, or Firm* — BROOKS KUSHMAN P.C.

(57) ABSTRACT

Provided by the embodiments of the present invention are a determination method, a terminal, and a network device, relating to the technical field of communications, and intended to solve the problem of uplink transmission delay in the related art when a UE uses semi-static scheduling for uplink transmission on an unlicensed band. The method include: receiving first information from a network device;
(Continued)

the first information is used to indicate M candidate transmission opportunities for an uplink data channel in a first period, the first period is a period of semi-static scheduling resources on an unlicensed band, and M is a positive integer greater than or equal to 2; and determining M candidate transmission opportunities for the uplink data channel in the first period according to the first information.

20 Claims, 6 Drawing Sheets

(58) Field of Classification Search
CPC ......... H04W 72/1215; H04W 72/1268; H04W 74/0808; H04W 72/04; H04L 5/0051; H04L 5/0094; H04L 5/001; H04L 27/0006
See application file for complete search history.

(56) References Cited

U.S. PATENT DOCUMENTS

| | | | |
|---|---|---|---|
| 2017/0257775 | A1 | 9/2017 | Jiang et al. |
| 2017/0332358 | A1 | 11/2017 | Park et al. |
| 2018/0035463 | A1 | 2/2018 | Mallik et al. |
| 2019/0191416 | A1 | 6/2019 | Xie et al. |
| 2019/0320491 | A1* | 10/2019 | Shukair ............. H04W 72/1268 |
| 2020/0052835 | A1* | 2/2020 | Xiong ................... H04L 1/1819 |
| 2020/0228289 | A1 | 7/2020 | He |
| 2020/0344804 | A1* | 10/2020 | Xu ............................ H04B 1/74 |

FOREIGN PATENT DOCUMENTS

| | | |
|---|---|---|
| CN | 105991272 A | 10/2016 |
| CN | 106797569 A | 5/2017 |
| CN | 107925523 A | 4/2018 |
| CN | 108307502 A | 7/2018 |

OTHER PUBLICATIONS

"UL Scheduling for eLAA" 3GPP TSG-RAN WG2 Meeting #93bis, R2-162394, Dobrovnik, Croatia. Apr. 11, 2016. Samsung.
Written Opinion and International Search report dated Oct. 25, 2019 as received in application No. PCT/CN2019/097427.
"On Listen Before Talk and Channel Access" 3GPP TSG RAN WG1 Meeting #79, R1-145003, San Francisco, USA, Nov. 17-21, 2014. Nokia Networks.
Chinese Office Action dated Dec. 2, 2020 as received in application No. 201810904371.0.
"Discussion on Category 2 LBT for UL transmission" 3GPP TSG RAN WG1 Meeting #82, R1-154138, Beijing, China, Aug. 24-28, 2015. Samsung.

* cited by examiner

DETERMINING METHOD, TERMINAL, AND NETWORK DEVICE

This application is a continuation application of International Application No. PCT/CN2019/097427 filed on Jul. 24, 2019, which claims priority to Chinese Patent Application No. 201810893011.5, filed with the National Intellectual Property Office on Aug. 7, 2018 and entitled "DETERMINING METHOD, TERMINAL, AND NETWORK DEVICE" and Chinese Patent Application No. 201810904371.0, filed with the National Intellectual Property Office on Aug. 9, 2018 and entitled "DETERMINING METHOD, TERMINAL, AND NETWORK DEVICE", which are incorporated herein by reference in their entireties.

TECHNICAL FIELD

This application relates to the field of communications technologies, and in particular, to a determining method, a terminal, and a network device.

BACKGROUND

In a future communications system, an unlicensed band may be used as a supplement to a licensed band to help an operator expand a service. The unlicensed band may work on a frequency band of 5 GHz, a frequency band of 37 GHz, and a frequency band of 60 GHz.

In a related technology, if a network device configures a semi-persistent scheduling resource for user equipment (UE), when the UE performs uplink transmission on the unlicensed band, the UE accesses the unlicensed band by using the semi-persistent scheduling resource. In this case, the UE needs to listen on a channel on the unlicensed band before a transmission occasion (in other words, a transmission moment and a time domain resource of an uplink channel) for semi-persistent scheduling arrives. If a listening result is "busy", the UE needs to wait for a next transmission occasion for semi-persistent scheduling, and listen on the channel on the unlicensed band before transmission. If the listening result is "idle", the UE may immediately perform uplink transmission on the transmission occasion for semi-persistent scheduling.

However, in the related technology, the UE has only one transmission occasion for semi-persistent scheduling in one semi-persistent scheduling period. Therefore, when the listening result is "busy", the UE cannot perform uplink transmission in a current semi-persistent scheduling period, and consequently an uplink transmission delay is increased.

SUMMARY

Embodiments of the present invention provide a determining method, a terminal, and a network device, to resolve a problem of an uplink transmission delay in a process in which UE performs uplink transmission through semi-persistent scheduling on an unlicensed band in a related technology.

To resolve the foregoing technical problem, this application is implemented as follows:

According to a first aspect, an embodiment of the present disclosure provides a determining method, where the method is applied to a terminal and includes:
receiving first information from a network device, where the first information is used to indicate M candidate transmission occasions of an uplink data channel in a first period, the first period is a period of a semi-persistent scheduling resource on an unlicensed band, and M is a positive integer greater than or equal to 2; and
determining the M candidate transmission occasions of the uplink data channel in the first period based on the first information.

According to a second aspect, an embodiment of the present invention provides a determining method, where the method is applied to a network device and includes:
sending first information to a terminal, where the first information is used to indicate M candidate transmission occasions of an uplink data channel in a first period, M is a positive integer greater than or equal to 2, the first period is a period of a semi-persistent scheduling resource on an unlicensed band, and the first information is used to instruct the terminal to determine the M candidate transmission occasions of the uplink data channel in the first period based on the first information.

According to a third aspect, an embodiment of the present invention provides a terminal, including:
a receiving module, configured to receive first information from a network device, where the first information is used to indicate M candidate transmission occasions of an uplink data channel in a first period, the first period is a period of a semi-persistent scheduling resource on an unlicensed band, and M is a positive integer greater than or equal to 2; and
a determining module, configured to determine the M candidate transmission occasions of the uplink data channel in the first period based on the first information received by the receiving module.

According to a fourth aspect, an embodiment of the present invention provides a network device, including:
a sending module, configured to send first information to a terminal, where the first information is used to indicate M candidate transmission occasions of an uplink data channel in a first period, M is a positive integer greater than or equal to 2, the first period is a period of a semi-persistent scheduling resource on an unlicensed band, and the first information is used to instruct the terminal to determine the M candidate transmission occasions of the uplink data channel in the first period based on the first information.

According to a fifth aspect, an embodiment of the present invention provides a terminal, including a processor, a memory, and a computer program that is stored in the memory and that can run on the processor, and when the computer program is executed by the processor, steps of the determining method provided in the first aspect are implemented.

According to a sixth aspect, an embodiment of the present invention provides a network device, including a processor, a memory, and a computer program that is stored in the memory and that can run on the processor, and when the computer program is executed by the processor, steps of the determining method provided in the second aspect are implemented.

According to a seventh aspect, an embodiment of the present invention provides a computer-readable storage medium, where the computer-readable storage medium stores a computer program, and when the computer program is executed by a processor, steps of the foregoing determining method are implemented.

In the embodiments of the present invention, after receiving the first information sent by the network device, the terminal may directly determine, based on the first information, a plurality of candidate transmission occasions of an uplink data channel in one period of the semi-persistent scheduling resource on the unlicensed band. Compared with a fact that there is only one candidate transmission occasion in one period of a semi-persistent scheduling resource in a related technology, in the embodiments of the present invention, the terminal has a plurality of transmission occasions in one period to perform uplink transmission, thereby reducing a probability of occurrence of an uplink transmission delay, and improving communication efficiency.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of this application.

The technical solutions provided in this application may be applied to various communications systems, for example, a 5G communications system, a future evolved system, or a plurality of communications fusion systems. A plurality of application scenarios may be included, for example, machine-to-machine (M2M), D2M, macro-micro communication, enhanced mobile broadband (eMBB), ultra-reliable and low latency communication (uRLLC), and massive machine type communication (mMTC). These scenarios include but are not limited to scenarios such as communication between terminals, communication between network devices, or communication between a network device and a terminal. The embodiments of the present invention may be applied to communication between a network device and a terminal in the 5G communications system, communication between terminals, or communication between network devices.

Figure 1:
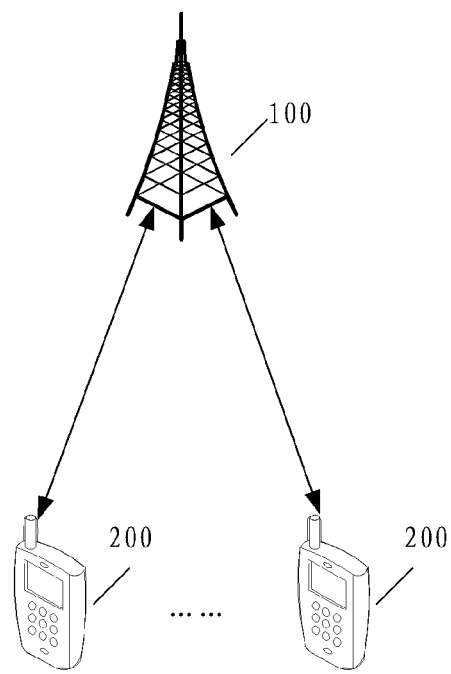
FIG. 1 is a schematic structural diagram of a communications system according to an embodiment of the present invention.

FIG. 1 is a possible schematic structural diagram of a communications system according to an embodiment of the present invention. As shown in FIG. 1, the communications system includes at least one network device 100 (only one network device is shown in FIG. 1) and one or more terminals 200 connected to each network device 100.

The network device 100 may be a base station, a core network device, a transmission and reception point (TRP), a relay station, an access point, or the like. The network device 100 may be a base transceiver station (BTS) in a global system for mobile communication (GSM) or a code division multiple access (CDMA) network, may be an NB (NodeB) in wideband code division multiple access (WCDMA), or may be an eNB or an eNodeB (evolutional NodeB) in LTE. The network device 100 may be alternatively a wireless controller in a cloud radio access network (CRAN) scenario. The network device 100 may be alternatively a network device in the 5G communications system or a network device in a future evolved network. However, the use of words does not constitute a limitation on this application.

The terminal 200 may be a wireless terminal or a wired terminal. The wireless terminal may be a device that provides voice and/or other service data connectivity for a user, a handheld device with a wireless communication function, a computing device, another processing device connected to a wireless modem, an in-vehicle device, a wearable device, a terminal in a future 5G network, a terminal in a future evolved PLMN network, or the like. The wireless terminal may communicate with one or more core networks by using a radio access network (RAN). The wireless terminal may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus that exchanges voice and/or data with a radio access network, and/or a device such as a personal communication service (PCS) phone, a cordless phone, a session initiation protocol (SIP) phone, a wireless local loop (WLL) station, or a personal digital assistant (PDA). The wireless terminal may be alternatively a mobile device, user equipment (UE), a UE terminal, an access terminal, a wireless communications device, a terminal unit, a terminal station, a mobile station, a mobile console, a remote station, a remote terminal, a subscriber unit, a subscriber station, a user agent, a terminal apparatus, or the like. In an example, in this embodiment of the present invention, a mobile phone is shown as an example of the terminal in FIG. 1.

In this specification, the term "and/or" is merely an association relationship that describes associated objects, and represents that there may be three relationships. For example, A and/or B may represent three cases: only A exists, both A and B exist, and only B exists. In addition, the character "I" in this specification generally indicates that associated objects are in an "or" relationship. In a formula, the character "I" indicates that associated objects are in a "divided" relationship. If not stated, "a plurality of" in this specification means two or more.

For ease of clearly describing the technical solutions in the embodiments of the present invention, in the embodiments of the present invention, the words "first" and "second" are used to distinguish between same or similar items with basically the same functions. A person skilled in the art may understand that the words "first" and "second" do not limit a quantity and an execution sequence.

It should be noted that, in the embodiments of the present invention, words such as "exemplary" or "for example" are used to indicate an example, an instance, or descriptions.

Any embodiment or design scheme described as "exemplary" or "an example" in the embodiments of the present invention should not be construed as being preferable or advantageous than other embodiments or design schemes. Specifically, the words such as "exemplary" or "for example" are used to present related concepts in a specific manner.

Figure 2:
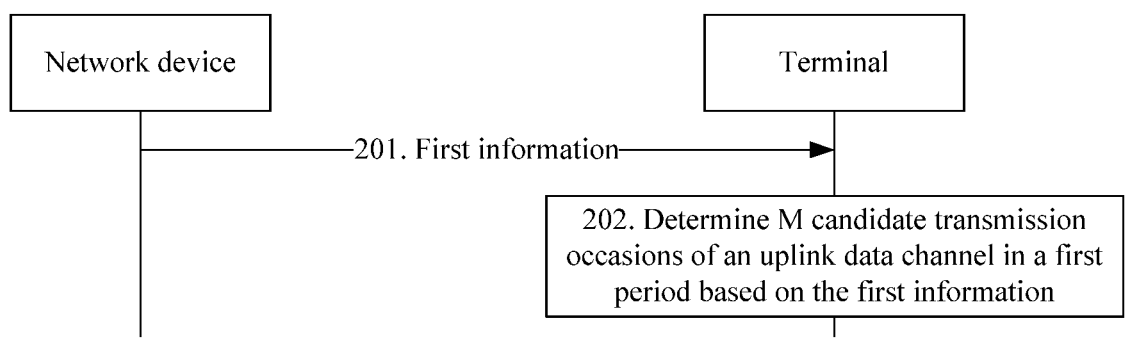
FIG. 2 is a schematic flowchart 1 of a determining method according to an embodiment of the present invention.

FIG. 2 is a schematic flowchart of a determining method according to an embodiment of the present invention. As shown in FIG. 2, the determining method may include the following steps.

Step 201: A network device sends first information to a terminal.

Correspondingly, the peer-end terminal receives the first information from the network device.

The network device in this embodiment of the present invention may be the network device in the communications system shown in FIG. 1, for example, a base station. The terminal in this embodiment of the present invention may be the terminal in the communications system shown in FIG. 1.

In this embodiment of the present invention, the first information is used to indicate M candidate transmission occasions of an uplink data channel in a first period, the first period is a period of a semi-persistent scheduling resource on an unlicensed band, and M is a positive integer greater than or equal to 2. The first information is used to instruct the terminal to determine the M candidate transmission occasions of the uplink data channel in the first period based on the first information. It should be noted that the candidate transmission occasion of the uplink data channel in this embodiment of the present invention may be a transmission time period of the uplink data channel.

For example, the uplink data channel may be a physical uplink shared channel (PUSCH).

In this embodiment of the present invention, the first information may be configuration information sent by the network device to the terminal, and the configuration information is used to configure the semi-persistent scheduling resource.

Optionally, in this embodiment of the present invention, the first information is used to indicate at least one of the following: a first time location of each candidate transmission occasion in the first period or a first time location of the first candidate transmission occasion in the first period, and a time window length (in other words, the M candidate transmission occasions are distributed in a time period corresponding to the time window length) and a time domain resource length set that are corresponding to the M candidate transmission occasions. The first candidate transmission occasion is the first one in the M candidate transmission occasions in the first period in time domain. The time domain resource length set includes at least one time domain resource length, and the at least one time domain resource length is used to indicate a time domain resource length of each candidate transmission occasion.

Figure 3:
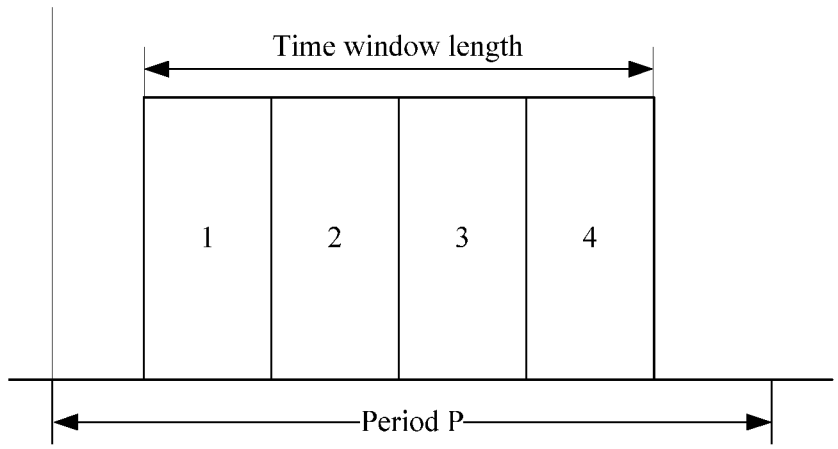
FIG. 3 is a schematic diagram 1 of candidate transmission occasions in a period P according to an embodiment of the present invention.

The time window length corresponding to the M candidate transmission occasions is used to represent a total time window length of all candidate transmission occasions in the first period, and the time window length includes the M candidate transmission occasions. As shown in FIG. 3, four candidate transmission occasions (namely, candidate transmission occasions 1, 2, 3, and 4 in FIG. 3) are configured in a period P in FIG. 3. The terminal may determine each candidate transmission occasion in the period P based on the time window length.

It should be noted that the time window length is less than or equal to duration of a first period. In addition, if the first information does not directly indicate the time window length, the terminal may use the duration of the first period as the time window length by default.

In an example, when the first information is used to indicate one time window length T, the terminal may determine a quantity M of candidate transmission occasions in the time window length and each candidate transmission occasion.

In an example, the first information includes at least one of the following: duration of a first period, a first time location of each candidate transmission occasion in the first period or a first time location of the first candidate transmission occasion in the first period, the time window length, and the time domain resource length set.

In an example, the first information is a first identifier, and the first identifier is used to indicate a start location and a time domain resource length of one or more candidate transmission occasions in an information table, or a start location and an end location of one or more candidate transmission occasions, or an end location and a time domain resource length of one or more candidate transmission occasions. The information table includes a start location and a time domain resource length of at least one candidate transmission occasion. For example, the information table may be predefined, or may be configured by the network device for the terminal.

For example, the start location or the end location of the candidate transmission occasion may be an offset relative to a reference point, and the offset and the time domain resource length are at a granularity of a subframe, a slot, or an orthogonal frequency division multiplexing (OFDM) symbol. It should be noted that the reference point may be a boundary of a slot or a subframe.

For example, the time domain resource length set mainly includes the following three cases:

In a first case, if there is one time domain resource length in the time domain resource length set, it indicates that time domain resource lengths of the M candidate transmission occasions are the same.

In a second case, if there are M time domain resource lengths in the time domain resource length set, it indicates that the time domain resource length set includes a time domain resource length of each candidate transmission occasion in the M candidate transmission occasions. It should be noted that each time domain resource length in the M time domain resource lengths corresponds to one candidate transmission occasion, and the M time domain resource lengths may be the same, may be different, or may be partially the same. This is not limited in the present invention.

In a third case, if there are N time domain resource lengths in the time domain resource length set, and N is a value greater than 1 and less than M, it indicates that time domain resource lengths of some candidate transmission occasions in the M candidate transmission occasions are the same, or it indicates that each candidate transmission occasion may have N time domain resource lengths.

Further optionally, in this embodiment of the present invention, the M candidate transmission occasions are consecutive or equally spaced in time domain.

Further optionally, in this embodiment of the present invention, the M candidate transmission occasions are located in an uplink slot/subframe/symbol.

In a TDD system, formats of the slot/subframe/symbol are classified into downlink (DL), uplink (UL), and flexible. When the format of the slot/subframe/symbol is flexible, the network device may configure or indicate that a direction of the slot/subframe/symbol is DL or UL. If there is no indication, the slot/subframe/symbol remains the flexible format.

In a possible implementation, all the M candidate transmission occasions are located in a UL slot/subframe/symbol, to be specific, when the terminal determines the candidate transmission occasion, a DL slot/subframe/symbol and a flexible slot/subframe/symbol are excluded.

In a possible implementation, the M candidate transmission occasions may be located in a UL slot/subframe/symbol or a flexible slot/subframe/symbol, to be specific, when the terminal determines the candidate transmission occasion, a DL slot/subframe/symbol is excluded.

In a possible implementation, when determining the candidate transmission occasion, the terminal determines the M candidate transmission occasions according to a time sequence, in other words, does not exclude a DL slot/subframe/symbol or a flexible slot/subframe/symbol. If all or some time domain resources of any candidate transmission occasion in the M candidate transmission occasions are DL, the terminal needs to give up the candidate transmission occasion. In this case, there may be less than M candidate transmission occasions in one period.

In a possible implementation, when determining the candidate transmission occasion, the terminal determines the M candidate transmission occasions according to a time sequence, in other words, does not exclude a DL slot/subframe/symbol or a flexible slot/subframe/symbol. If all or some time domain resources of any candidate transmission occasion in the M candidate transmission occasions are DL or flexible, the terminal needs to give up the candidate transmission occasion. In this case, there may be less than M candidate transmission occasions in one period.

In this embodiment of the present invention, the foregoing value M may be directly configured by the network device, or may be calculated by the terminal based on the first information.

Specific implementation of a scenario in which the foregoing value M is calculated by the terminal based on the first information is described by using the following two examples.

Example 1: It is assumed that a start location of an $n^{th}$ candidate transmission occasion in the period P is located at a $K^{th}$ OFDM symbol after an end location of an $(n-1)^{th}$ candidate transmission occasion, in other words, a time domain interval between two adjacent candidate transmission occasions is K−1, a time domain resource length of each candidate transmission occasion in the period P is L OFDM symbols, and a start location of the first candidate transmission occasion is an $s^{th}$ OFDM symbol of duration of the period. In this case, a quantity M of candidate transmission occasions in the period P may be calculated based on the following formula: $M=\text{floor}((P-S-1)/(L+K-1))$, where S≥1, and K≥0.

Example 2: It is assumed that a start location of an $n^{th}$ candidate transmission occasion in the period P is located at a $K^{th}$ OFDM symbol after an end location of an $(n-1)^{th}$ candidate transmission occasion, in other words, a time domain interval between two adjacent candidate transmission occasions is K−1, a time domain resource length of each candidate transmission occasion in the period P is L OFDM symbols, and a time window length of each candidate transmission occasion in the period P is T. In this case, a quantity M of candidate transmission occasions in the period P may be calculated based on the following formula: $M=\text{floor}((T)/(L+K-1))$, where S≥1, and K≥0.

Step 202: Determine M candidate transmission occasions of an uplink data channel in a first period based on the first information.

Optionally, in this embodiment of the present invention, the foregoing step 202 specifically includes the following step 202a or step 202b.

Step 202a: When the first information is used to indicate a first time location of each candidate transmission occasion, the terminal determines each candidate transmission occasion based on the first time location of each candidate transmission occasion and a corresponding time domain resource length.

In this embodiment of the present invention, if the M candidate transmission occasions are consecutive in time domain, the terminal may directly determine each candidate transmission occasion based on the first time location of each candidate transmission occasion and the corresponding time domain resource length; and if the M candidate transmission occasions are spaced apart in time domain, the terminal needs to determine each candidate transmission occasion based on the first time location of each candidate transmission occasion, the corresponding time domain resource length, and a spacing length.

Step 202b: When the first information is used to indicate a first time location of the first candidate transmission occasion, determine each candidate transmission occasion based on the first time location of the first candidate transmission occasion and a corresponding time domain resource length.

In this embodiment of the present invention, the terminal may determine a first time location of another candidate transmission occasion in the M candidate transmission occasions except the first candidate transmission occasion based on the first time location of the first candidate transmission occasion and a time domain resource length of each candidate transmission occasion, and then determine each candidate transmission occasion based on the first time location of each candidate transmission occasion and the corresponding time domain resource length.

In this embodiment of the present invention, if the M candidate transmission occasions are consecutive in time domain, the terminal may determine each candidate transmission occasion based on the first time location of the first candidate transmission occasion and the corresponding time domain resource length; and if the M candidate transmission occasions are spaced apart in time domain, the terminal needs to determine each candidate transmission occasion based on the first time location of the first candidate transmission occasion, the corresponding time domain resource length, and a spacing length.

In this embodiment of the present invention, when the first information is used to indicate duration of a first period, a first time location of each candidate transmission occasion in the first period or a first time location of the first candidate transmission occasion in the first period, and one time domain resource length, time domain resource lengths of the M candidate transmission occasions are the same, and the candidate transmission occasions are consecutive in time domain; or time domain resource lengths of the M candidate transmission occasions are the same, an interval between any two adjacent candidate transmission occasions is the same in time domain, a size of the interval is X slots or symbols, and X is a positive integer greater than 0.

In this embodiment of the present invention, when the first information is used to indicate duration of a first period, a first time location of each candidate transmission occasion in the first period or a first time location of the first candidate transmission occasion in the first period, and N time domain resource lengths (namely, $L_1, L_2, \ldots, L_N$), the terminal determines $M_1$ candidate transmission occasions based on $L_1$ in the N time domain resource lengths, and then, determines $M_2$ candidate transmission occasions based on $L_2$ in the N time domain resource lengths; and by analogy, until the M candidate transmission occasions are determined, where $M=M_1+M_2+ \ldots M_j$. In other words, the terminal determines the M candidate transmission occasions based on $L_j$ in the N time domain resource lengths, where j is greater than or equal to 1, and is less than or equal to N.

The $M_1$ candidate transmission occasions are consecutive in time domain, the $M_2$ candidate transmission occasions are consecutive in time domain, and the $M_j$ candidate transmission occasions are consecutive in time domain.

Alternatively, an interval between any two adjacent candidate transmission occasions in the $M_1$ candidate transmission occasions is the same in time domain, an interval between any two adjacent candidate transmission occasions in the $M_2$ candidate transmission occasions is the same in time domain, and an interval between any two adjacent candidate transmission occasions in the $M_j$ candidate transmission occasions is the same in time domain, where a size of the interval is X slots or symbols, and X is a positive integer greater than 0.

Figure 4:
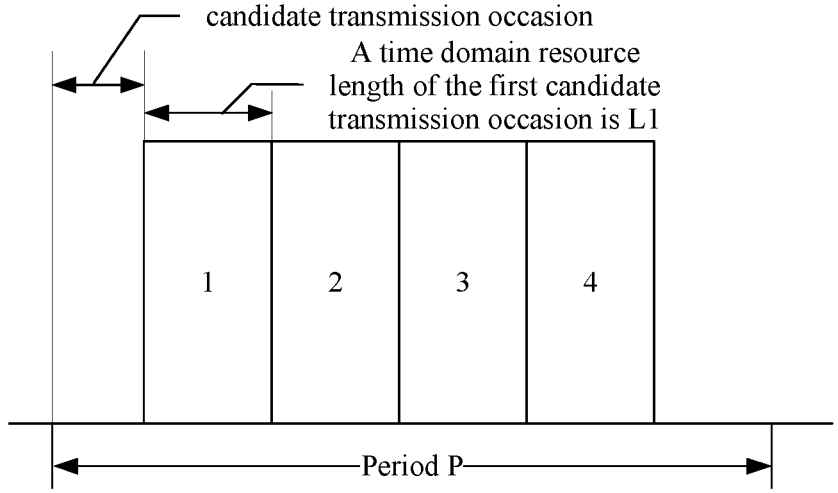
FIG. 4 is a schematic diagram 2 of candidate transmission occasions in a period P according to an embodiment of the present invention.

It may be learned from a schematic diagram of candidate transmission occasions of an uplink data channel in a period P shown in FIG. 4 that a start location of the first candidate transmission occasion may be indicated by using an offset in the period P. When the network device configures a start location of the first candidate transmission occasion in the period P and one time domain resource length for the terminal, as shown in FIG. 4, time domain resource lengths of four candidate transmission occasions in FIG. 4 are the same. The terminal may determine each candidate transmission occasion (namely, candidate transmission occasions 1, 2, 3, and 4 in FIG. 4) in the period P based on the start location of the first candidate transmission occasion and the time domain resource length.

Figure 5:
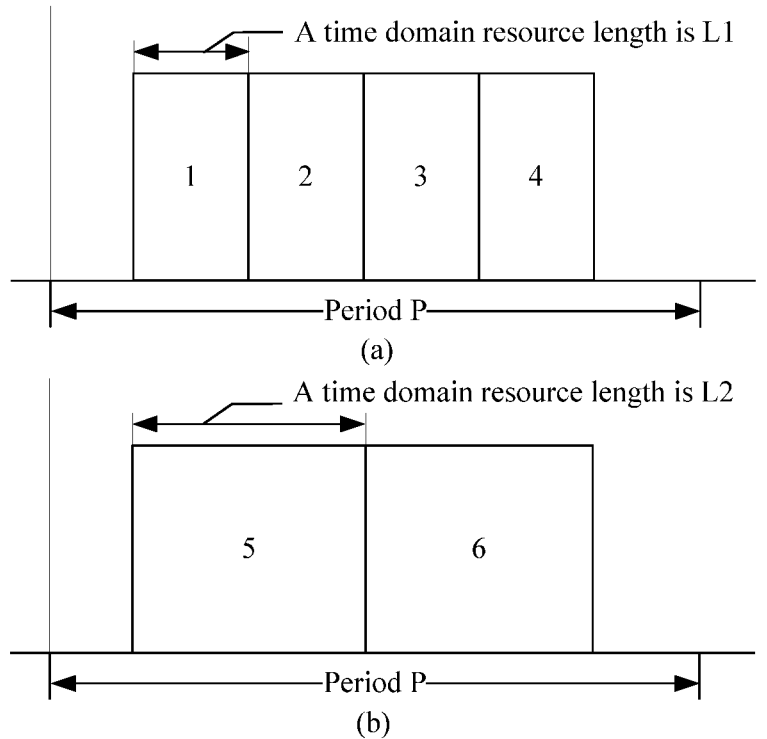
FIG. 5 is a schematic diagram 3 of candidate transmission occasions in a period P according to an embodiment of the present invention.

It may be learned from a schematic diagram of candidate transmission occasions of an uplink data channel in a period P shown in FIG. 5 that, when two time domain resource lengths $L_1$ and $L_2$ in the period P are configured for the terminal, as shown in (a) in FIG. 5, the terminal obtains four candidate transmission occasions (namely, candidate transmission occasions 1, 2, 3, and 4 in (a) in FIG. 5) based on $L_1$, and it may be learned from (a) in FIG. 5 that time domain resource lengths of the four candidate transmission occasions are the same and the four candidate transmission occasions are consecutive in time domain; and as shown in (b) in FIG. 5, the terminal obtains two candidate transmission occasions (namely, candidate transmission occasions 5 and 6 in (b) in FIG. 5) based on $L_2$, and it may be learned from (b) in FIG. 5 that time domain resource lengths of the two candidate transmission occasions are the same and the two candidate transmission occasions are consecutive in time domain. In this case, there are six candidate transmission occasions in the period P, namely, the foregoing candidate transmission occasions 1 to 6.

Figure 6:
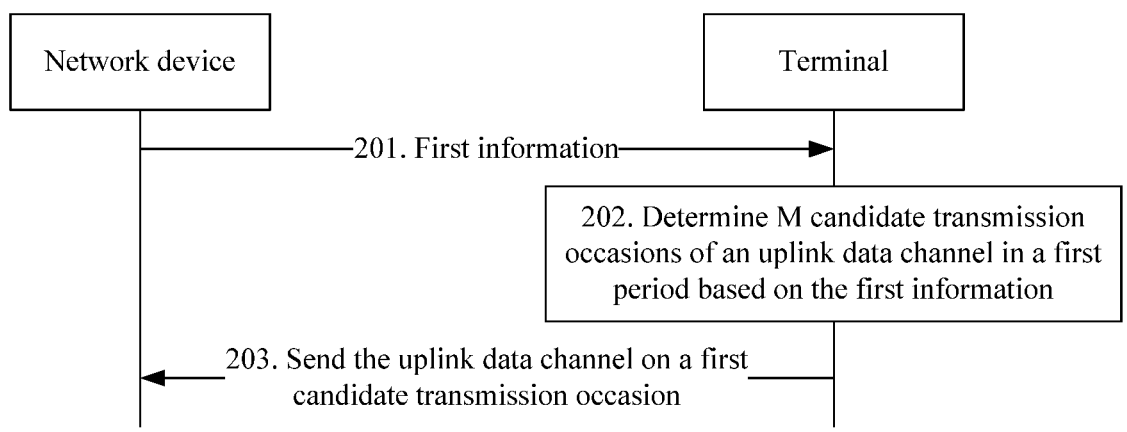
FIG. 6 is a schematic flowchart 2 of a determining method according to an embodiment of the present invention.

Optionally, in this embodiment of the present invention, as shown in FIG. 6, after step 202 or in a process in which the terminal performs step 202, the method further includes the following step.

Step 203: The terminal sends the uplink data channel on a first candidate transmission occasion.

Correspondingly, the network device receives the uplink data channel sent by the terminal on the first candidate transmission occasion.

In this embodiment of the present invention, before the first candidate transmission occasion, a listening result of listening on the semi-persistent scheduling resource by the terminal is idle. The first candidate transmission occasion is at least one candidate transmission occasion in the M candidate transmission occasions, in other words, the terminal may send the uplink data channel on one or more candidate transmission occasions in one period. The uplink data channel carries uplink control information (UCI). The UCI is used to indicate a start moment and/or an end moment of the uplink data channel.

It should be noted that when the terminal sends the uplink data channel on a plurality of candidate transmission occasions in one period, one uplink data channel is sent on each candidate transmission occasion, and each sent uplink data channel includes the UCI.

In this embodiment of the present invention, before performing step 203, the terminal performs a Listen Before Talk (LBT) mechanism. Specifically, before the terminal performs uplink transmission, the terminal needs to perform LBT, to listen on a channel on the unlicensed band. When a listening result is idle, the terminal needs to immediately perform uplink transmission, in other words, candidate transmission occasions after the listening result of listening on the channel on the unlicensed band is idle are available candidate transmission occasions. In this case, the terminal may select the first candidate transmission occasion from the available candidate transmission occasions. Certainly, when the listening result is busy, the terminal cannot perform uplink transmission. In this case, the terminal continues to listen on the channel on the unlicensed band, and cannot perform uplink transmission until the listening result is idle before the candidate transmission occasion arrives.

Optionally, in this embodiment of the present invention, the UCI is mapped to an OFDM symbol that is on the uplink data channel and that starts with a first OFDM symbol. The first OFDM symbol is an $X^{th}$ OFDM symbol after the first set of consecutive OFDM symbols that carries a demodulation reference signal DMRS, or the first OFDM symbol is a $Z^{th}$ OFDM symbol before the first set of consecutive OFDM symbols that carries the DMRS, where X and Z are positive integers greater than or equal to 1. It should be noted that X and Z are predefined or configured by the network device for the terminal, and X and Z may be the same or different.

In this embodiment of the present invention, the terminal may map the UCI to a corresponding time-frequency resource in a frequency domain priority manner or a time domain priority manner. A mapping manner may be specifically but is not limited to the following mapping manners:

Manner 1: When the uplink data channel includes an additional DMRS, the UCI starts to be mapped from an OFDM symbol after a front-loaded DMRS on the uplink data channel.

Manner 2: If the terminal is configured to perform frequency hopping on the uplink data channel, the terminal segments the UCI based on a quantity of frequency hopping times, and then the uplink data channel carries one UCI segment on each hop of the uplink data channel.

For example, the foregoing step 203 specifically includes the following step.

Step 203*a*: The terminal performs frequency hopping on the uplink data channel.

One UCI segment is carried on each hop of the uplink data channel, and the UCI segment carried on each hop is different. The UCI includes N+1 UCI segments, where N is a quantity of frequency hopping times, and N is a positive integer greater than or equal to 1.

For example, when the network device configures or instructs the terminal to enable frequency hopping, the terminal performs frequency hopping on the uplink data channel.

For example, the UCI segment carried on each hop of the uplink data channel is mapped, in a frequency domain priority manner or a time domain priority manner, to an OFDM symbol after a $Y^{th}$ symbol after the first set of consecutive OFDM symbols that carries the DMRS. Y is predefined or configured by the network device for the terminal, and Y may be the same as or different from X.

According to the determining method provided in this embodiment of the present invention, after receiving the first information sent by the network device, the terminal may directly determine, based on the first information, a plurality of candidate transmission occasions of an uplink data channel in one period of the semi-persistent scheduling resource on the unlicensed band. Compared with a fact that there is only one candidate transmission occasion in one period of a semi-persistent scheduling resource in a related technology, in this embodiment of the present invention, the terminal has a plurality of transmission occasions in one period to perform uplink transmission, thereby reducing a probability of occurrence of an uplink transmission delay, and improving communication efficiency.

Figure 7:
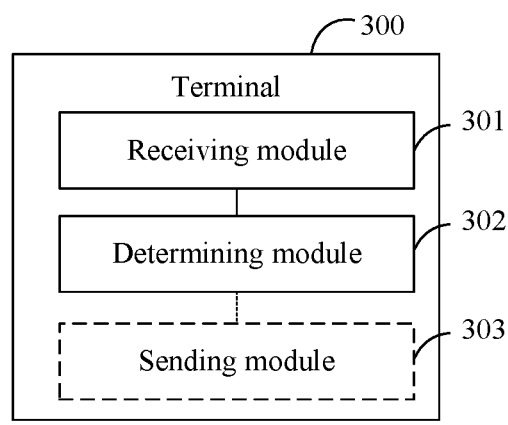
FIG. 7 is a schematic structural diagram 1 of a terminal according to an embodiment of the present invention.

As shown in FIG. 7, an embodiment of the present invention provides a terminal 300. The terminal 300 includes a receiving module 301 and a determining module 302.

The receiving module 301 is configured to receive first information from a network device, where the first information is used to indicate M candidate transmission occasions of an uplink data channel in a first period, the first period is a period of a semi-persistent scheduling resource on an unlicensed band, and M is a positive integer greater than or equal to 2.

The determining module 302 is configured to determine the M candidate transmission occasions of the uplink data channel in the first period based on the first information received by the receiving module 301.

Optionally, the first information is specifically used to indicate at least one of the following: a first time location of each candidate transmission occasion in the first period or a first time location of the first candidate transmission occasion in the first period, and a time window length and a time domain resource length set that are corresponding to the M candidate transmission occasions, where the first time location includes at least one of the following: a start location and an end location, the time domain resource length set includes at least one time domain resource length, and the at least one time domain resource length is used to indicate a time domain resource length of each candidate transmission occasion.

Optionally, the M candidate transmission occasions are consecutive or equally spaced in time domain.

Optionally, the M candidate transmission occasions are located in an uplink slot/subframe/symbol.

Optionally, the determining module 302 is specifically configured to: when the first information received by the receiving module 301 is used to indicate the first time location of each candidate transmission occasion, determine each candidate transmission occasion based on the first time location of each candidate transmission occasion and a corresponding time domain resource length; or when the first information received by the receiving module 301 is used to indicate the first time location of the first candidate transmission occasion, determine each candidate transmission occasion based on the first time location of the first candidate transmission occasion and a corresponding time domain resource length.

Optionally, as shown in FIG. 7, the terminal 300 further includes a sending module 303.

The sending module 303 is configured to send the uplink data channel on a first candidate transmission occasion. Before the first candidate transmission occasion, a listening result of listening on the semi-persistent scheduling resource by the terminal 300 is idle. The first candidate transmission occasion is at least one candidate transmission occasion in the M candidate transmission occasions, and the uplink data channel carries UCI.

Optionally, the UCI is mapped to an OFDM symbol that is on the uplink data channel and that starts with a first OFDM symbol. The first OFDM symbol is an $X^{th}$ OFDM symbol after the first set of consecutive OFDM symbols that carries a demodulation reference signal DMRS, or the first OFDM symbol is a $Z^{th}$ OFDM symbol before the first set of consecutive OFDM symbols. X and Z are predefined or configured by the network device for the terminal, and X and Z are positive integers greater than or equal to 1.

Optionally, the sending module 303 is specifically configured to perform frequency hopping on the uplink data channel. One UCI segment is carried on each hop of the uplink data channel, and the UCI includes N+1 UCI segments, where N is a quantity of frequency hopping times.

According to the terminal provided in this embodiment of the present invention, after receiving the first information sent by the network device, the terminal may directly determine, based on the first information, a plurality of candidate transmission occasions of an uplink data channel in one period of the semi-persistent scheduling resource on the unlicensed band. Compared with a fact that there is only one candidate transmission occasion in one period of a semi-persistent scheduling resource in a related technology, in this embodiment of the present invention, the terminal has a plurality of transmission occasions in one period to perform uplink transmission, thereby reducing a probability of occurrence of an uplink transmission delay, and improving communication efficiency.

The terminal provided in this embodiment of the present invention can implement content in the foregoing method embodiment. To avoid repetition, details are not described herein again.

Figure 8:
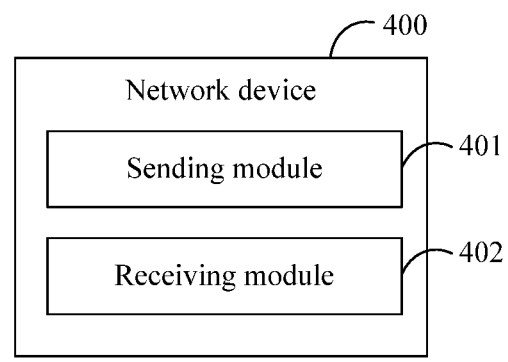
FIG. 8 is a schematic structural diagram 1 of a network device according to an embodiment of the present invention.

As shown in FIG. 8, an embodiment of the present invention provides a network device. The network device 400 includes a sending module 401.

The sending module 401 is configured to send first information to a terminal, where the first information is used to indicate M candidate transmission occasions of an uplink data channel in a first period, M is a positive integer greater than or equal to 2, the first period is a period of a semi-persistent scheduling resource on an unlicensed band, and the first information is used to instruct the terminal to determine the M candidate transmission occasions of the uplink data channel in the first period based on the first information.

Optionally, the first information is used to indicate at least one of the following: a first time location of each candidate transmission occasion in the first period or a first time location of the first candidate transmission occasion in the first period, and a time window length and a time domain resource length set that are corresponding to the M candidate transmission occasions, where the first time location includes at least one of the following: a start location and an end location, the time domain resource length set includes at least one time domain resource length, and the at least one time domain resource length is used to indicate a time domain resource length of each candidate transmission occasion.

Optionally, the M candidate transmission occasions are consecutive or equally spaced in time domain.

Optionally, the M candidate transmission occasions are located in an uplink slot/subframe/symbol.

Optionally, as shown in FIG. 8, the network device 400 further includes a receiving module 402.

The receiving module 402 is configured to receive the uplink data channel sent by the terminal on a first candidate transmission occasion. Before the first candidate transmission occasion, a listening result of listening on the semi-persistent scheduling resource by the terminal is idle. The first candidate transmission occasion is at least one candidate transmission occasion in the M candidate transmission occasions, and the uplink data channel carries UCI.

Optionally, the UCI is mapped to an OFDM symbol that is on the uplink data channel and that starts with a first OFDM symbol. The first OFDM symbol is an $X^{th}$ OFDM symbol after the first set of consecutive OFDM symbols that carries a demodulation reference signal DMRS, or the first OFDM symbol is a $Z^{th}$ OFDM symbol before the first set of consecutive OFDM symbols. X and Z are predefined or configured by the network device for the terminal, and X and Z are positive integers greater than or equal to 1.

According to the network device provided in this embodiment of the present invention, the network device sends the first information to the terminal, so that the terminal may directly determine, based on the first information, a plurality of candidate transmission occasions of an uplink data channel in one period of the semi-persistent scheduling resource on the unlicensed band. Compared with a fact that there is only one candidate transmission occasion in one period of a semi-persistent scheduling resource in a related technology, in this embodiment of the present invention, the terminal has a plurality of transmission occasions in one period to perform uplink transmission, thereby reducing a probability of occurrence of an uplink transmission delay, and improving communication efficiency.

The network device provided in this embodiment of the present invention can implement content in the foregoing method embodiment. To avoid repetition, details are not described herein again.

Figure 9:
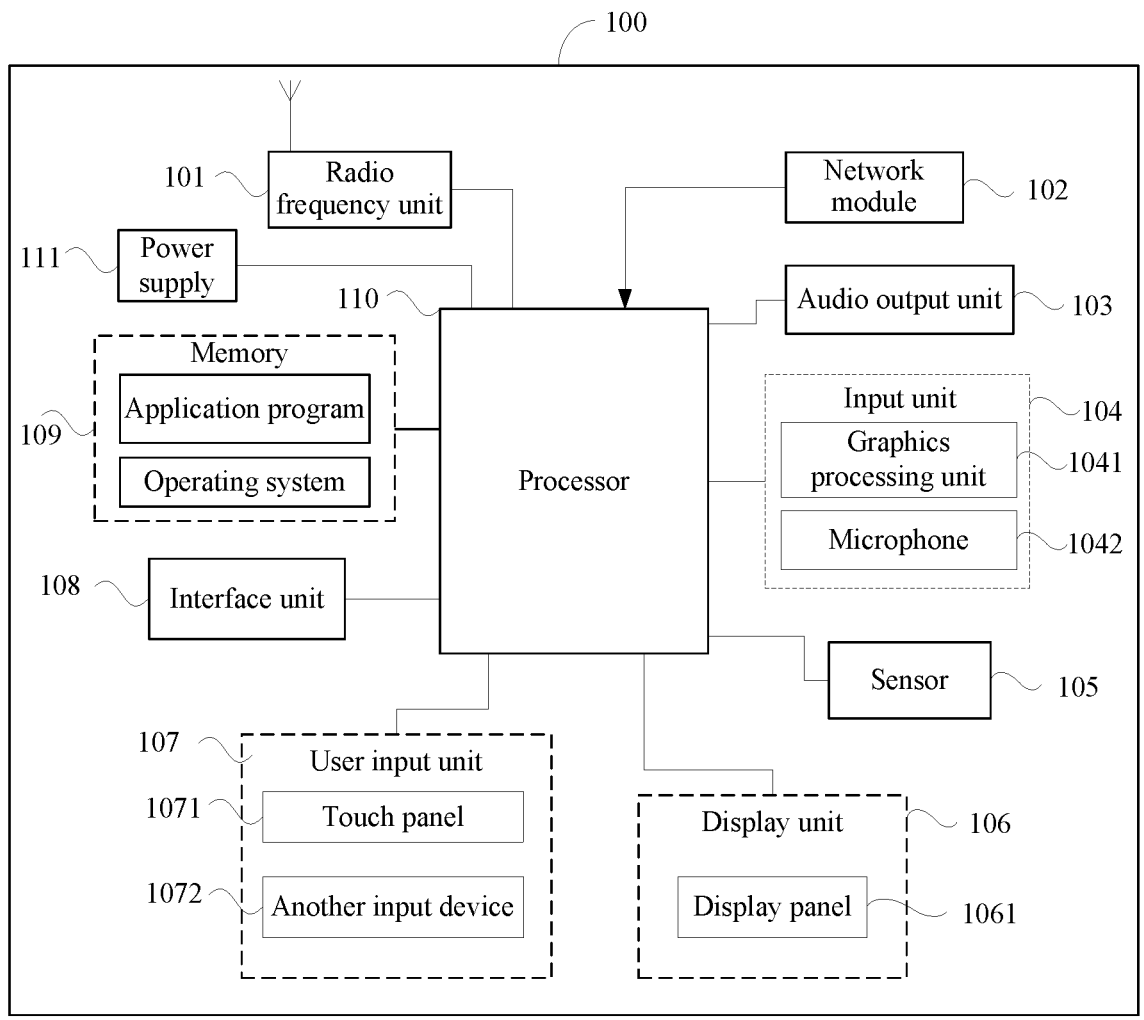
FIG. 9 is a schematic structural diagram 2 of a terminal according to an embodiment of the present invention.

FIG. 9 is a schematic diagram of a hardware structure of a terminal for implementing the embodiments of the present invention. The terminal 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a structure of the terminal 100 shown in FIG. 9 does not constitute a limitation on the terminal, and the terminal 100 may include more or fewer components than those shown in the figure, or combine some components, or have different component arrangements. In this embodiment of the present invention, the terminal 100 includes but is not limited to a mobile phone, a tablet computer, a laptop computer, a palmtop computer, an in-vehicle terminal, a wearable device, a pedometer, and the like.

The radio frequency unit 101 is configured to receive first information sent by a network device. The first information is used to indicate M candidate transmission occasions of an uplink data channel in a first period, M is a positive integer greater than or equal to 2, and the first period is a period of a semi-persistent scheduling resource on an unlicensed band. The processor 110 is configured to determine the M candidate transmissions of the uplink data channel in the first period based on the first information received by the radio frequency unit 101.

According to the terminal provided in this embodiment of the present invention, after receiving the first information sent by the network device, the terminal may directly determine, based on the first information, a plurality of candidate transmission occasions of an uplink data channel in one period of the semi-persistent scheduling resource on the unlicensed band. Compared with a fact that there is only one candidate transmission occasion in one period of a semi-persistent scheduling resource in a related technology, in this embodiment of the present invention, the terminal has a plurality of transmission occasions in one period to perform uplink transmission, thereby reducing a probability of occurrence of an uplink transmission delay, and improving communication efficiency.

It should be understood that, in this embodiment of the present invention, the radio frequency unit 101 may be configured to receive and send information or receive and send a signal in a call process. Specifically, after the radio frequency unit 101 receives downlink data from a base station, the radio frequency unit 101 sends the downlink data to the processor 110, and the processor 110 processes the downlink data. In addition, the radio frequency unit 101 sends uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and another device by using a wireless communication system.

The terminal 100 provides wireless broadband Internet access for a user by using the network module 102, for example, helping the user send and receive an email, browse a web page, and access streaming media.

The audio output unit 103 may convert audio data received by the radio frequency unit 101 or the network module 102 or stored in the memory 109 into an audio signal and output as sound. In addition, the audio output unit 103 may further provide audio output (for example, call signal receiving sound or message receiving sound) related to a specific function performed by the terminal 100. The audio output unit 103 includes a loudspeaker, a buzzer, a telephone receiver, and the like.

The input unit 104 is configured to receive an audio or video signal. The input unit 104 may include a graphics processing unit (GPU) 1041 and a microphone 1042. The graphics processing unit 1041 processes image data of a static picture or a video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and can process such sound into audio data. The processed audio data may be output by being converted into a format that may be sent to a mobile communications base station by using the radio frequency unit 101 in a telephone call mode.

The terminal 100 further includes at least one sensor 105, such as an optical sensor, a motion sensor, and another sensor. Specifically, the optical sensor includes an ambient light sensor and a proximity sensor, where the ambient light sensor can adjust brightness of the display panel 1061 based on brightness of ambient light, and the proximity sensor can turn off the display panel 1061 and/or backlight when the terminal 100 moves towards the ear. As a type of the motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecule sensor, a gyroscope, a barometer, a hygrometer, a thermometer, and an infrared sensor. Details are not described herein.

The display unit 106 is configured to display information entered by a user or information provided for the user. The display unit 106 may include a display panel 1061, and the display panel 1061 may be configured in a form of a liquid crystal display (LCD), an organic light-emitting diode (OLED), or the like.

The user input unit 107 may be configured to receive input digit or character information and generate key signal input related to user setting and function control of the terminal 100. Specifically, the user input unit 107 includes a touch panel 1071 and another input device 1072. The touch panel 1071, also referred to as a touch screen, can collect user's touch operations on or near the touch panel 1071 (for example, user's operations on or near the touch panel 1071 with any appropriate object or accessory such as a finger and a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be implemented by using a plurality of types such as a resistive type, a capacitive type, an infrared ray, and a surface acoustic wave. In addition to the touch panel 1071, the user input unit 107 may further include the another input device 1072. Specifically, the another input device 1072 may include, but is not limited to, a physical keyboard, function keys (such as a volume control key and a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. In FIG. 9, the touch panel 1071 and the display panel 1061 are used as two independent components to implement input and output functions of the terminal 100. However, in some embodiments, the touch panel 1071 and the display panel 1061 may be integrated to implement the input and output functions of the terminal 100. This is not specifically limited herein.

The interface unit 108 is an interface connecting an external apparatus to the terminal 100. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 108 may be configured to receive input (for example, data information and power) from the external apparatus and transmit the received input to one or more elements in the terminal 100, or may be configured to transmit data between the terminal 100 and the external apparatus.

The memory 109 may be configured to store a software program and various data. The memory 109 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 109 may include a high-speed random access memory, and may further include a non-volatile memory such as at least one magnetic disk storage component, a flash memory component, or another volatile solid-state storage component.

The processor 110 is a control center of the terminal 100, and is connected to all parts of the entire terminal 109 by using various interfaces and lines, and performs various functions of the terminal 100 and processes data by running or executing the software program and/or the module that are stored in the memory 109 and invoking the data stored in the memory 109, to implement overall monitoring on the terminal 100. The processor 110 may include one or more processing units. Optionally, the processor 110 may be integrated with an application processor and a modem processor. The application processor mainly processes an operating system, a user interface, an application program, and the like, and the modem processor mainly processes wireless communication. It may be understood that the modem processor may also not be integrated into the processor 110.

The terminal 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal 100 includes some function modules not shown, and details are not described herein.

Figure 10:
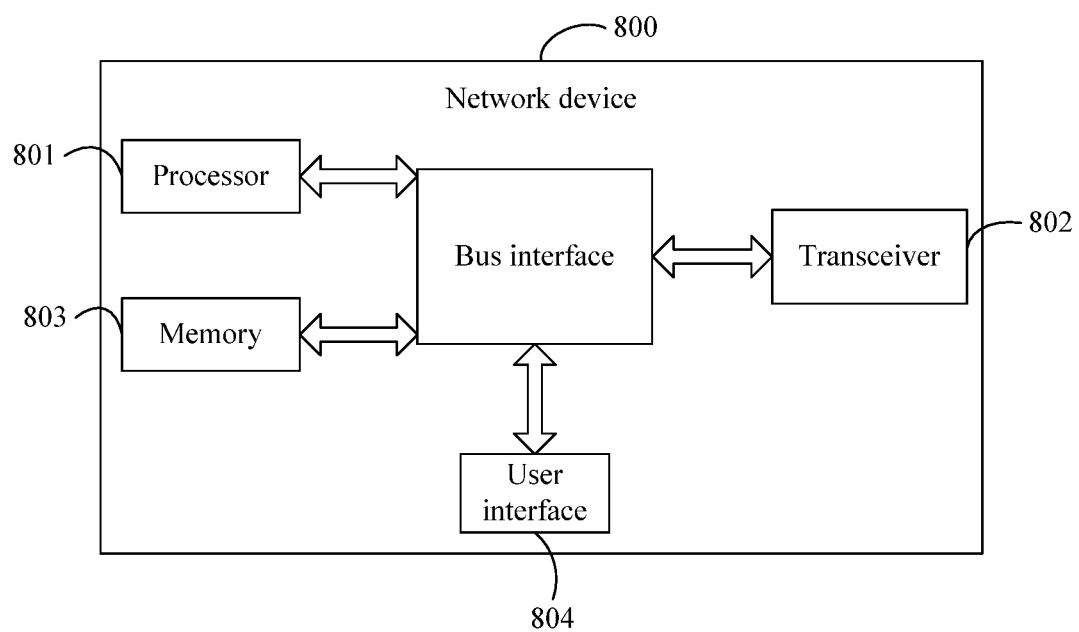
FIG. 10 is a schematic structural diagram 2 of a network device according to an embodiment of the present invention.

FIG. 10 is a schematic diagram of a hardware structure of a network device for implementing the embodiments of the present invention. The network device 800 includes a processor 801, a transceiver 802, a memory 803, a user interface 804, and a bus interface.

The sending module 802 is configured to send first information to a terminal, where the first information is used to indicate M candidate transmission occasions of an uplink data channel in a first period, M is a positive integer greater than or equal to 2, the first period is a period of a semi-persistent scheduling resource on an unlicensed band, and the first information is used to instruct the terminal to determine the M candidate transmission occasions of the uplink data channel in the first period based on the first information.

According to the network device provided in this embodiment of the present invention, the network device sends the first information to the terminal, so that the terminal may directly determine, based on the first information, a plurality of candidate transmission occasions of an uplink data channel in one period of the semi-persistent scheduling resource on the unlicensed band. Compared with a fact that there is only one candidate transmission occasion in one period of a semi-persistent scheduling resource in a related technology, in this embodiment of the present invention, the terminal has a plurality of transmission occasions in one period to perform uplink transmission, thereby reducing a probability of occurrence of an uplink transmission delay, and improving communication efficiency.

In this embodiment of the present invention, in FIG. 10, a bus architecture may include any quantity of interconnected buses and bridges, and is specifically linked by various circuits of one or more processors represented by the processor 801 and a memory represented by the memory 803. The bus architecture may further connect together various other circuits of a peripheral device, a voltage stabilizer, a power management circuit, and the like, which are known in this art and will not be further described herein. The bus interface provides an interface. The transceiver 802 may include a plurality of elements, that is, include a transmitter and a receiver, and provide units for communication with various other apparatuses on a transmission medium. For different user equipment, the user interface 804 may alternatively be an interface for externally and internally connecting required equipment. The connected equipment includes but is not limited to a keypad, a display, a speaker, a microphone, a joystick, and the like. The processor 801 is responsible for managing the bus architecture and common processing, and the memory 803 may store data used when the processor 801 performs an operation.

In addition, the network device 800 further includes some function modules not shown, and details are not described herein.

Optionally, an embodiment of the present invention further provides a terminal, including a processor, a memory, and a computer program that is stored in the memory and that can run on the processor. When the computer program is executed by the processor, the process of the determining method shown in the foregoing method embodiments is implemented, and a same technical effect can be achieved. To avoid repetition, details are not described herein.

Optionally, an embodiment of the present invention further provides a network device, including a processor, a memory, and a computer program that is stored in the memory and that can run on the processor. When the computer program is executed by the processor, the process of the determining method shown in the foregoing method embodiments is implemented, and a same technical effect can be achieved. To avoid repetition, details are not described herein.

An embodiment of the present invention further provides a computer-readable storage medium. A computer program is stored in the computer-readable storage medium. When being executed by a processor, the process of the determining method shown in the foregoing method embodiments is implemented, and a same technical effect can be achieved. To avoid repetition, details are not described herein. The computer-readable storage medium includes a read-only memory (ROM for short), a random access memory (RAM for short), a magnetic disk, an optical disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. In the absence of more restrictions, an element defined by the statement "including a" does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present invention.

The embodiments of the present invention are described with reference to the accompanying drawings. However, the present invention is not limited to the foregoing specific implementations. The foregoing specific implementations are merely exemplary, but are not limiting. A person of ordinary skill in the art may make many forms without departing from the objective and the scope of the claims of the present invention.

The invention claimed is:

1. A determining method, performed by a terminal, wherein the method comprises:
   receiving first information from a network device, wherein the first information indicates M candidate transmission occasions not excluding a downlink (DL) slot/subframe/symbol or a flexible slot/subframe/symbol of an uplink data channel in a first period, the first period is a period of a semi-persistent scheduling resource on an unlicensed band, and M is a positive integer greater than or equal to 2; and
   determining the M candidate transmission occasions of the uplink data channel in the first period based on the first information;
   wherein the first information indicates a time domain resource length set that is corresponding to the M candidate transmission occasions; and the time domain resource length set comprises at least one time domain resource length, and the at least one time domain resource length indicates a time domain resource length of each candidate transmission occasion;
   wherein the determining method further comprises:
   determining if all or some time domain resources of any candidate transmission occasion in the M candidate transmission occasions are downlink (DL); and
   excluding, from the M candidate transmission occasions, any candidate transmission occasion of which all or some time domain resources are downlink (DL).

2. The method according to claim 1, wherein the first information further indicates at least one of the following: a first time location of each candidate transmission occasion in the first period; a first time location of a first candidate transmission occasion in the first period; or, a time window length that is corresponding to the M candidate transmission occasions, wherein each of the first time location of each candidate transmission occasion in the first period and the first time location of the first candidate transmission occasion in the first period comprises at least one of the following: a start location or an end location.

3. The method according to claim 2, wherein the M candidate transmission occasions are consecutive or equally spaced in time domain.

4. The method according to claim 2, wherein the M candidate transmission occasions are located in an uplink slot/subframe/symbol.

5. The method according to claim 2, wherein the determining the M candidate transmission occasions of the uplink data channel in the first period based on the first information comprises:
when the first informations indicates a first time location of each candidate transmission occasion, determining each candidate transmission occasion based on the first time location of each candidate transmission occasion and a corresponding time domain resource length; or
when the first information indicates a first time location of the first candidate transmission occasion, determining each candidate transmission occasion based on the first time location of the first candidate transmission occasion and a corresponding time domain resource length.

6. The method according to claim 1, wherein the method further comprises:
sending the uplink data channel on a first candidate transmission occasion; wherein
before the first candidate transmission occasion, a listening result of listening on the semi-persistent scheduling resource by the terminal is idle, the first candidate transmission occasion is at least one of the M candidate transmission occasions, and the uplink data channel carries uplink control information UCI.

7. A terminal, comprising: a processor, a memory, and a computer program that is stored in the memory and that can run on the processor, wherein when the computer program is executed by the processor, the processor is configured to perform steps of:
receiving first information from a network device, wherein the first information indicates M candidate transmission occasions not excluding a downlink (DL) slot/subframe/symbol or a flexible slot/subframe/symbol of an uplink data channel in a first period, the first period is a period of a semi-persistent scheduling resource on an unlicensed band, and M is a positive integer greater than or equal to 2; and
determining the M candidate transmission occasions of the uplink data channel in the first period based on the first information;
wherein the first information indicates a time domain resource length set that is corresponding to the M candidate transmission occasions; and the time domain resource length set comprises at least one time domain resource length, and the at least one time domain resource length indicates a time domain resource length of each candidate transmission occasion;
wherein the processor is further configured to perform:
determining if all or some time domain resources of any candidate transmission occasion in the M candidate transmission occasions are downlink (DL); and
excluding, from the M candidate transmission occasions, any candidate transmission occasion of which all or some time domain resources are downlink (DL).

8. The terminal according to claim 7, wherein the first information is further indicates at least one of the following: a first time location of each candidate transmission occasion in the first period; a first time location of a first candidate transmission occasion in the first period; or, a time window length that is corresponding to the M candidate transmission occasions, wherein each of the first time location of each candidate transmission occasion in the first period and the first time location of the first candidate transmission occasion in the first period comprises at least one of the following: a start location or an end location.

9. The terminal according to claim 8, wherein the M candidate transmission occasions are consecutive or equally spaced in time domain.

10. The terminal according to claim 8, wherein the M candidate transmission occasions are located in an uplink slot/subframe/symbol.

11. The terminal according to claim 8, wherein the processor is configured to:
when the first information indicates a first time location of each candidate transmission occasion, determine each candidate transmission occasion based on the first time location of each candidate transmission occasion and a corresponding time domain resource length; or
when the first information indicates a first time location of the first candidate transmission occasion, determine each candidate transmission occasion based on the first time location of the first candidate transmission occasion and a corresponding time domain resource length.

12. The terminal according to claim 7, wherein the processor is configured to:
send the uplink data channel on a first candidate transmission occasion; wherein
before the first candidate transmission occasion, a listening result of listening on the semi-persistent scheduling resource by the terminal is idle, the first candidate transmission occasion is at least one of the M candidate transmission occasions, and the uplink data channel carries uplink control information UCI.

13. The terminal according to claim 12, wherein the UCI is mapped to an orthogonal frequency division multiplexing OFDM symbol that is on the uplink data channel and that starts with a first OFDM symbol, the first OFDM symbol is an $X^{th}$ OFDM symbol after a first set of consecutive OFDM symbols that carries a demodulation reference signal DMRS, or the first OFDM symbol is a $Z^{th}$ OFDM symbol before the first set of consecutive OFDM symbols, X and Z are predefined or configured by the network device for the terminal, and X and Z are positive integers greater than or equal to 1.

14. The terminal according to claim 13, wherein the processor is configured to:
perform frequency hopping on the uplink data channel; wherein
the UCI comprises N+1 UCI segments, one UCI segment is carried on each hop of the uplink data channel, N is a quantity of frequency hopping times, and N is a positive integer greater than or equal to 1.

15. A network device, comprising: a processor, a memory, and a computer program that is stored in the memory and that can run on the processor, wherein when the computer program is executed by the processor, the processor is configured to perform steps of:

sending first information to a terminal, wherein the first information indicates to the terminal M candidate transmission occasions not excluding a downlink (DL) slot/subframe/symbol or a flexible slot/subframe/symbol of an uplink data channel in a first period, M is a positive integer greater than or equal to 2, the first period is a period of a semi-persistent scheduling resource on an unlicensed band, and the first information instructs the terminal to determine the M candidate transmission occasions of the uplink data channel in the first period based on the first information and exclude, from the M candidate transmission occasions, any candidate transmission occasion of which all or some time domain resources in are downlink (DL);

wherein the first information indicates a time domain resource length set that is corresponding to the M candidate transmission occasions; and the time domain resource length set comprises at least one time domain resource length, and the at least one time domain resource length indicates a time domain resource length of each candidate transmission occasion.

16. The network device according to claim 15, wherein the first information further indicates at least one of the following: a first time location of each candidate transmission occasion in the first period; a first time location of a first candidate transmission occasion in the first period; or, a time window length that is corresponding to the M candidate transmission occasions, wherein each of the first time location of each candidate transmission occasion in the first period and the first time location of the first candidate transmission occasion in the first period comprises at least one of the following: a start location or an end location.

17. The network device according to claim 16, wherein the M candidate transmission occasions are consecutive or equally spaced in time domain.

18. The network device according to claim 16, wherein the M candidate transmission occasions are located in an uplink slot/subframe/symbol.

19. The network device according to claim 15, wherein the processor is configured to:
receive the uplink data channel sent by the terminal on a first candidate transmission occasion; wherein
before the first candidate transmission occasion, a listening result of listening on the semi-persistent scheduling resource by the terminal is idle, the first candidate transmission occasion is at least one of the M candidate transmission occasions, and the uplink data channel carries uplink control information UCI.

20. A non-transitory computer-readable storage medium, wherein the computer-readable storage medium stores a computer program, and when the computer program is executed by a processor, steps of the determining method according to claim 1 are implemented.

* * * * *